US012674669B2

(12) United States Patent
Thompson et al.

(10) Patent No.: US 12,674,669 B2
(45) Date of Patent: Jul. 7, 2026

(54) PERSONAL PROTECTIVE EQUIPMENT WITH MOVEMENT-BASED NAVIGATION

(71) Applicant: 3M INNOVATIVE PROPERTIES COMPANY, St. Paul, MN (US)

(72) Inventors: Darin K. Thompson, Huntersville, NC (US); Nicholas T. Gabriel, Grand Rapids, MN (US); Traian Morar, Matthews, NC (US); Richard Olivera, Charlotte, NC (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 70 days.

(21) Appl. No.: 18/721,078

(22) PCT Filed: Dec. 14, 2022

(86) PCT No.: PCT/IB2022/062255
§ 371 (c)(1),
(2) Date: Jun. 17, 2024

(87) PCT Pub. No.: WO2023/126737
PCT Pub. Date: Jul. 6, 2023

(65) Prior Publication Data
US 2025/0060216 A1      Feb. 20, 2025

Related U.S. Application Data

(60) Provisional application No. 63/295,020, filed on Dec. 30, 2021.

(51) Int. Cl.
G01C 21/16          (2006.01)
(52) U.S. Cl.
CPC .................................. G01C 21/16 (2013.01)

(58) Field of Classification Search
CPC ........ G01C 21/16; G01C 21/206; A62B 5/00; A62B 9/00
(Continued)

(56) References Cited

U.S. PATENT DOCUMENTS 6,522,266 B1      2/2003   Soehren
2002/0072881 A1    6/2002   Saitta
(Continued)

FOREIGN PATENT DOCUMENTS

WO          2021209529 A1    10/2021
WO          2021255606 A1    12/2021

OTHER PUBLICATIONS

"Scott Sight N.0 Self-Extraction", 3M Personal Safety Division, 2024, p. 1.
(Continued)

*Primary Examiner* — Tuan C To
*Assistant Examiner* — Dominick Mulder
(74) *Attorney, Agent, or Firm* — Vincent L. Pham; Jonathan V. Sry; Katherine M. Scholz

(57)          ABSTRACT

A system includes personal protective equipment (PPE) configured to be worn by an agent. The PPE includes a sensor assembly configured to generate sensor data including one or more of motion data, heading data, and inertial data. The system also includes at least one computing device configured to receive the sensor data from the sensor assembly. The at least one computing device is also configured to generate pose data of the agent based on the sensor data in response to a series of movements by the agent away from an arrival point. The pose data includes an agent location, an agent heading, and a movement activity type for each pose in a series of poses. The at least one computing device is further configured to generate a navigation path based on the pose data.

12 Claims, 8 Drawing Sheets

200

Determine whether to start building navigation path    ~202

Receive movement-related sensor data    ~204

Generate pose data    ~206

Generate navigation path    ~208

(58) Field of Classification Search
USPC ......................................................... 701/472
See application file for complete search history.

(56) References Cited

U.S. PATENT DOCUMENTS

| | | | |
|---|---|---|---|
| 2003/0125868 | A1 | 7/2003 | Giannopoulos et al. |
| 2004/0030491 | A1 | 2/2004 | Hull |
| 2006/0022882 | A1* | 2/2006 | Gerder ................... H01Q 1/273 |
| | | | 343/718 |
| 2011/0276264 | A1 | 11/2011 | Plocher et al. |
| 2013/0166198 | A1 | 6/2013 | Funk |
| 2014/0365114 | A1* | 12/2014 | van Os .............. G01C 21/3632 |
| | | | 701/428 |
| 2015/0160658 | A1* | 6/2015 | Reedman ................ G01S 15/06 |
| | | | 701/3 |
| 2015/0354951 | A1* | 12/2015 | Ali ........................ G06F 3/0346 |
| | | | 702/141 |
| 2016/0081415 | A1* | 3/2016 | Handshaw ............. A42B 3/046 |
| | | | 2/5 |
| 2017/0296094 | A1* | 10/2017 | Fonzi, III ............. A61B 5/0002 |
| 2018/0206099 | A1* | 7/2018 | O'Connor ............. G01K 1/026 |
| 2018/0233019 | A1* | 8/2018 | Werronen ........... G08B 21/182 |
| 2021/0172975 | A1* | 6/2021 | Song .................. A63B 71/0605 |
| 2021/0216677 | A1 | 7/2021 | Santarone |
| 2022/0172594 | A1* | 6/2022 | Cho ........................ B60Q 5/006 |
| 2022/0388170 | A1* | 12/2022 | Merewether ........... B25J 9/1664 |
| 2023/0068746 | A1* | 3/2023 | Colatruglio ........... A41D 31/10 |
| 2023/0377448 | A1* | 11/2023 | Shyu ...................... G08B 21/02 |

OTHER PUBLICATIONS

International Search Report for PCT International Application No.
PCT/IB2022/062255, mailed on Mar. 23, 2023, 4 pages.

* cited by examiner

14

20

Sensor assembly

24

Agent interface assembly

50

Computing Device

Input/Output Interface

52

Processing Circuitry

54

Memory

56

Figure 5:
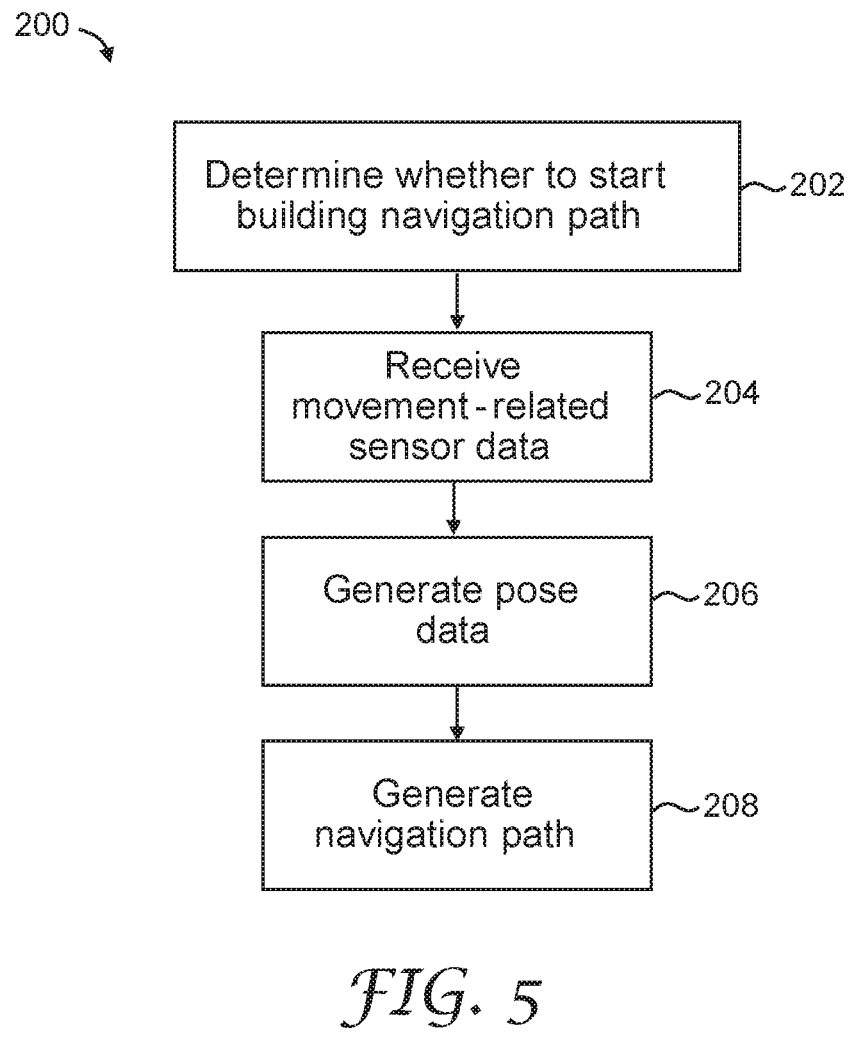

200

Determine whether to start building navigation path ~202

Receive movement-related sensor data ~204

Generate pose data ~206

Generate navigation path ~208

Determine whether to start
providing instructions ~222

Receive
movement-related
sensor data ~224

Generate pose
data ~226

Generate
instruction data ~228

Provide
instructions to
agent ~230

260

PERSONAL PROTECTIVE EQUIPMENT WITH MOVEMENT-BASED NAVIGATION

CROSS-REFERENCE TO RELATED APPLICATIONS

This application is a national stage filing under 35 U.S.C. § 371 of International Patent Application No. PCT/IB2022/062255, filed 14 Dec. 2022, which claims the benefit of Provisional U.S. Patent Application No. 63/295,020, filed 30 Dec. 2021, the entire disclosure of each of which is incorporated herein by reference.

The present technology generally relates to personal protective equipment.

SUMMARY

Personal protective equipment (PPE), or a personal safety device, may be worn by an agent (such as a firefighter) that captures the agent's location and movement in an environment. If the agent becomes lost or disorientated, the captured information may be used to generate an egress navigation path for the agent to follow and return to an arrival point, or point of entry. The PPE may provide the directions in the form of aural information (e.g., audio prompts), visual information (e.g., visual indicators), or tactile information (e.g., haptic feedback), or a combination of all three.

In one aspect, the present disclosure relates to a system including personal protective equipment (PPE) configured to be worn by an agent. The PPE includes a sensor assembly configured to generate sensor data including one or more of motion data, heading data, and inertial data. The system also includes at least one computing device including a memory and processing circuitry coupled to the memory. The at least one computing device is configured to receive the sensor data from the sensor assembly. The at least one computing device is also configured to generate pose data of the agent based on the sensor data in response to a series of movements by the agent away from an arrival point. The pose data includes an agent location, an agent heading, and a movement activity type for each pose in a series of poses. The at least one computing device is further configured to generate a navigation path based on the pose data.

BRIEF DESCRIPTION OF DRAWINGS

FIG. 5 illustrates a flow diagram of a process for generating a map using the PPE of FIG. 1.

DETAILED DESCRIPTION

The present disclosure describes personal protective equipment (PPE) articles, systems, and associated techniques for protecting and aiding agents, such as firefighters or emergency responders, while deployed in in hazardous environments. More specifically, technical solutions for PPE systems are described that enable assisted real-time navigation path, or map, construction and navigation of into and out of hazardous environments, even in conditions that would otherwise impair the sight of agents and limit existing systems.

Figure 1:
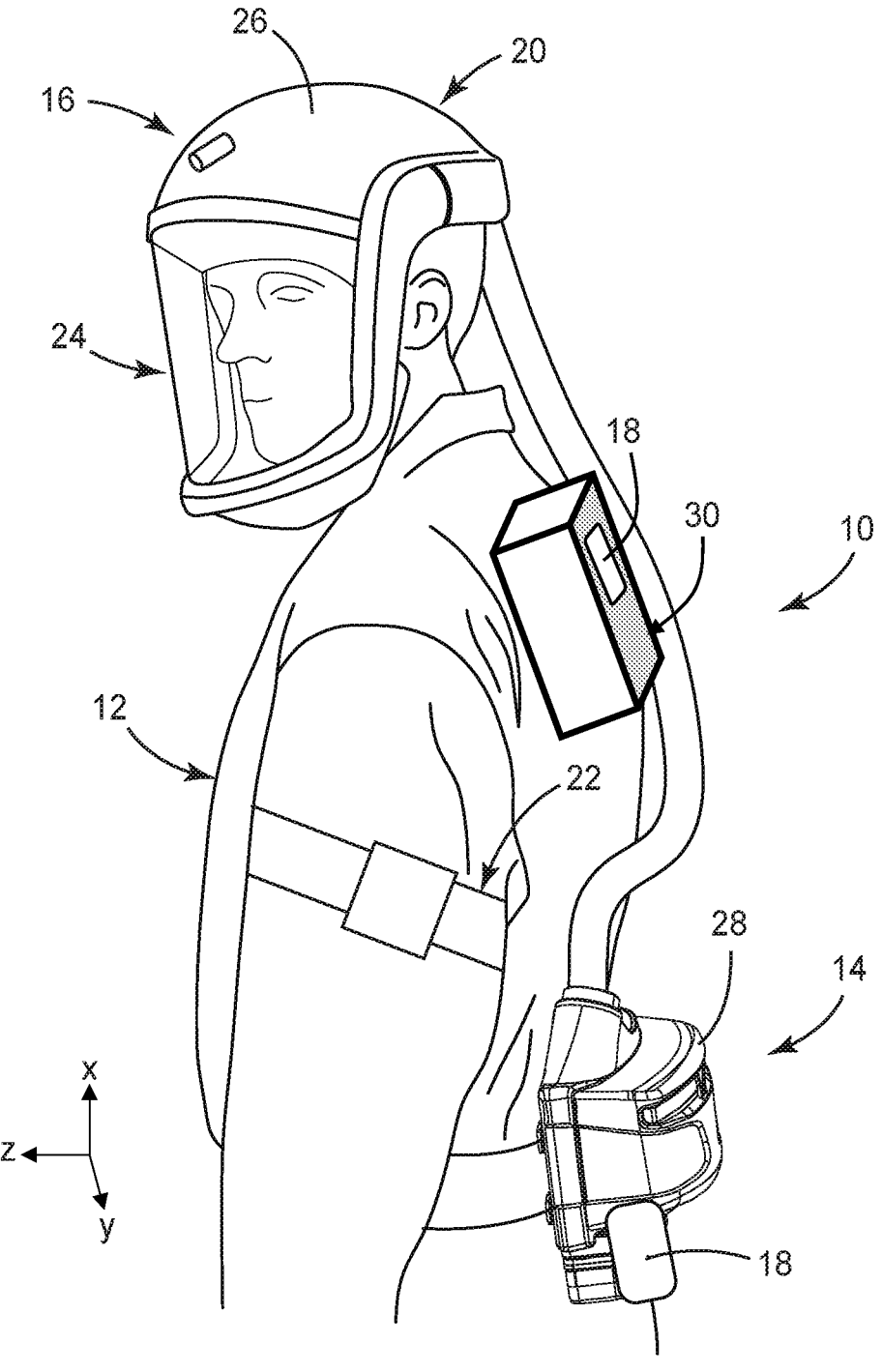
FIG. 1 illustrates an environment for using a personal protective equipment (PPE) on an agent.

FIG. 1 shows an environment 10 including an agent 12 wearing a PPE 14. The environment 10 may be a hazardous environment. PPE 14 may include, for example, a self-contained breathing apparatus (SCBA), an air-purifying apparatus, a backpack, etc. As shown, the agent 12 is wearing a PPE 14 that may be described as a breathing apparatus including a helmet 26 (e.g., including a facepiece or facemask), a waist pack 28, and an optional backpack 30 with a frame. In other embodiments, PPE 14 may include an oxygen cylinder or another pack with a frame. For example, a PPE may include a helmet 26 and a backpack 30 without a waist pack. In general, the PPE 14 includes a mask and a source of breathable air.

In general, the PPE 14 is configured to be worn by the agent 12. The PPE 14 includes a sensor assembly 20 configured to generate sensor data, which includes one or more sensors at any suitable location on the PPE 14. The sensor data provides at least information about the location (or position), orientation, or movements of the agent 12. The sensor data may be used by at least one computing device 50 (see FIG. 2) of the PPE 14 to generate a navigation path when the agent 12 moves away from an arrival point 110 (see FIG. 3). The PPE 14 may also provide instruction data to the agent 12 when the agent desires to move toward the arrival point 110 (see FIG. 4), for example, through the agent interface assembly 24. In some embodiments, the PPE 14 may be configured to generate the navigation path and instruction data in an environment 10 where global positioning system (GPS) data is not readily available or accessible, such as inside a building.

At least some sensor data generated by the sensor assembly 20 is related to movements made by the agent 12 and may be described as movement-related sensor data, which includes one or more of motion data, heading data, and inertial data. The sensor assembly 20 of the PPE 14 may include one or more of a motion detector configured to generate motion data, heading detector configured to generate heading data, inertial detector configured to generate inertial data, or any other device that may provide data regarding the agents location, orientation, or movements in the environment 10.

As used herein, the term "motion data" means data indicating movement of an agent and may be generated using any suitable motion detector, such as an inertial measurement unit (IMU), accelerometer, or gyroscope. Motion data may also be derived, or calculated, from other types of sensors, such as a global positioning system (GPS) device, a radar device, a lidar device, a sonar device, or a radio frequency (RF) device (e.g., a Bluetooth, ultra-wideband (UWB), or Wi-Fi device) configured to provide time-of-flight (ToF), angle of arrival (AoA), or angle of departure (AoD) data.

As used herein, the term "heading data" means data indicating a heading of an agent and may be generated using any suitable heading detector, such as a compass sensor, an inertial measurement unit, or gyroscope. Heading data may also be derived, or calculated, from other types of sensors, such as an RF device configured to provide angle of arrival (AoA) or angle of departure (AoD) data or GPS location data over time.

As used herein, the term "inertial data" means data indicating an inertia of an agent and may be recorded using any suitable inertial detector, for example, an inertial measurement unit, an accelerometer, or a gyroscope.

In general, calibration data from a wireless communication interface of the PPE 14 may be used to calibrate, or supplement, the movement-related sensor data. For example, the movement-related sensor data may be used to determine one or more agent location relative to one another, which may include errors in some cases. The wireless communication interface may receive calibration data that serves as a reference to calibrate one or more of those location relative to a known location, which may be known relative to an apparatus 112 (see FIG. 3), such as a fire engine. In some embodiments, a wireless communication interface may include an RF device (e.g., Bluetooth, Wi-Fi, UWB) configured to generate calibration data, such as AoA, AoD, ToF data.

The sensor assembly 20 may include one or more subassemblies configured to be positioned on various parts of the agent. Subassemblies positioned on different parts of the agent may provide signals that are similar or differential, which can be processed to make various determinations, such as a type of movement activity being made by the agent. Various examples of using sensors in different subassemblies are described herein.

Various types of sensors may also be integrated. In some embodiments, the sensor assembly 20 includes a 6-axis IMU to provide 3D accelerometer data (motion data) and 3D gyroscope data (motion or heading data) mounted on the PPE 14 proximate to the agent's upper back, such as on backpack 30, which optionally includes a 3-axis magnetic sensor as a compass sensor (heading data).

In the illustrated embodiment, the sensor assembly 20 includes a head-mounted sensor subassembly 16 and a body-mounted sensor subassembly 18. In general, the body-mounted sensor subassembly 18 is mounted on the torso or arm of the agent. Certain sensors may benefit from being head-mounted, such as line-of-sight sensors, while others may benefit from being body-mounted. In some embodiments, the same type of sensor may be used in both the head-mounted sensor subassembly 16 and body-mounted sensor subassembly 18, and data from those sensors may be compared. In one example, an inertial detector in the head-mounted sensor assembly 16 may be used to capture rotation of the head and an inertial detector in the body-mounted sensor subassembly 18 may be used to capture translational motion decoupled from the head rotations.

The sensor assembly 20 may also include agent input devices configured to capture agent input and generate agent input data. Agent input devices may include a microphone, a touch interface, a button, a camera, or other device capable of capturing input from the agent 10. In one example, the agent may provide a voice input indicating that the agent 12 wishes to return to the arrival point 110, which may be captured by a microphone and used to generate agent input data. In another example, a touch interface may include an inertial interface, which may capture agent gestures such as a tap to a facepiece or elsewhere on the helmet 26.

The agent interface assembly 24 is configured to provide agent perceptible output. The agent perceptible output may include a visual, aural, or tactile information. In some embodiments, the agent interface assembly 24 includes at least one of a heads-up display (HUD), a transducer, or a tactile actuator. A heads-up display may be provided as an in-mask display that presents a user interface in the visual field of the agent 12. An example of headgear described in this disclosure incorporates a head-up display (HUD) that includes a transparent display configured to present data without requiring the wearers to look away from his/her regular viewpoints of field of view (FoV). A transducer may include a speaker, bone conductor, or other device configured to generate an audible indicator to the agent 12 in the aural field of the agent 12. A tactile actuator may include a vibrator or other suitable device to provide tactile indicator to the agent 12.

At least a portion of the agent interface assembly 24 may be head-mounted. For example, a heads-up display and a transducer may be head-mounted components to efficiently provide visual or aural indicators. At least a portion of the agent interface assembly 24 may be body-mounted. For example, a tactile actuator may be body-mounted on an arm, front torso, or back or the agent 12. In some embodiments, a tactile actuator may also be head-mounted.

The PPE 14 may further include accessory systems (not shown) for the sensor assembly. For example, PPE 14 may include power equipment, such as batteries, for operating the sensor assembly 20 and agent interface assembly 24.

The PPE 14 may also include a communication hub 22. The communication hub 22 may be mounted on a backpack, an arm, a facepiece, a helmet, or any other suitable location on the agent's body. As illustrated, the communication hub 22 is arm mounted. The communication hub 22 may be configured to perform one or more functions, transmit data to another computing device for performing one or more functions, or receive data from another computing device that has performed one or more functions. In some embodiments, at least a portion of the body-mounted sensor subassembly 18 of the sensor assembly 20 may be positioned in, or on, the arm-mounted communication hub 22. In some embodiments, at least a portion of the agent interface assembly 24 may be positioned in, or on, the arm-mounted communication hub 22.

Figure 2:
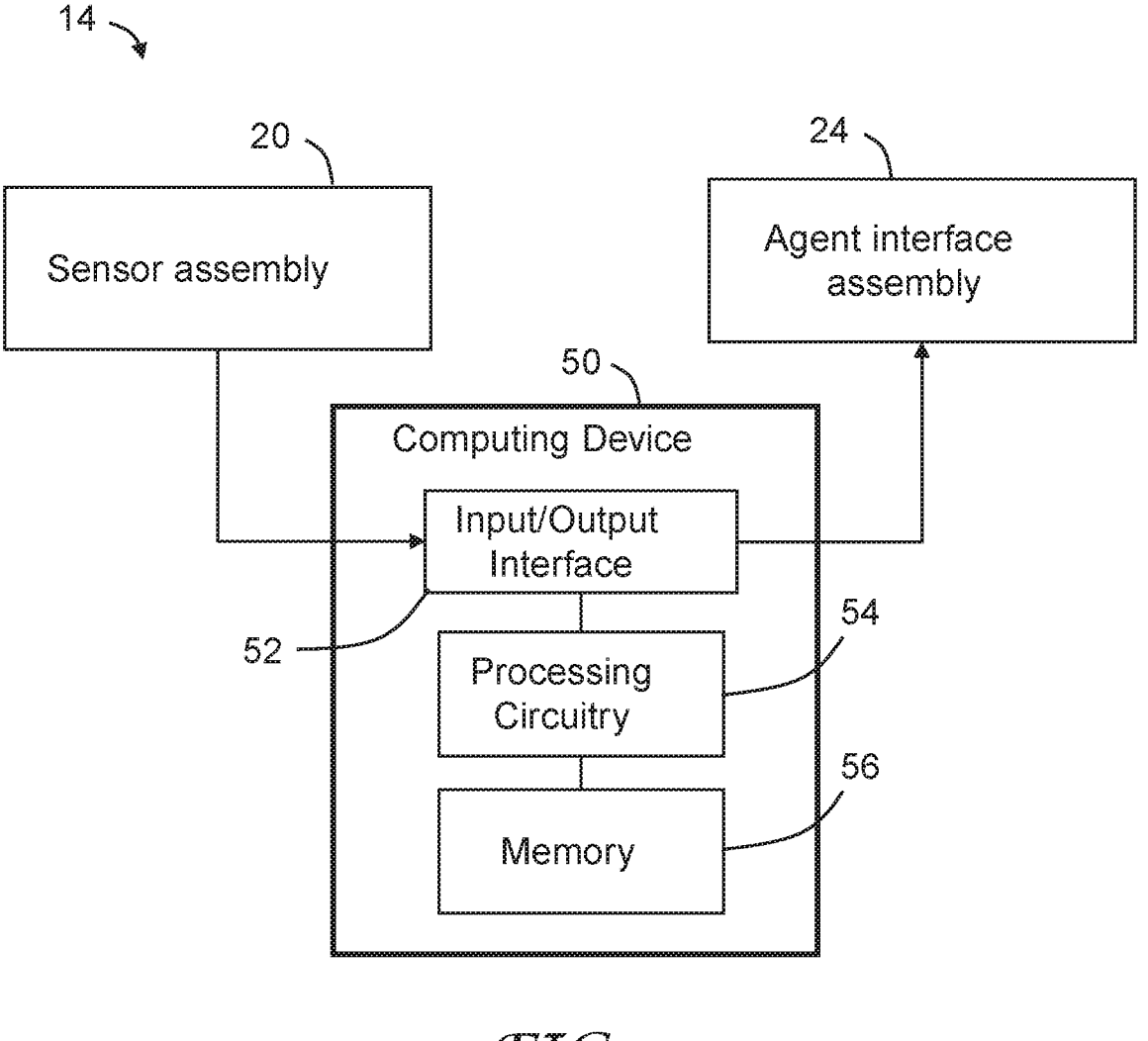
FIG. 2 illustrates a functional block diagram of the PPE of FIG. 1.

FIG. 2 shows a functional block diagram of the PPE 14. At least one computing device 50 of the PPE 14 includes an input/output interface 52, processing circuitry 54 operably coupled to the input/output interface 52, and memory 56 operably coupled to the processing circuitry 54. The computing device 50 may also be operably coupled to the sensor assembly 20 and the agent interface assembly 24, for example, through the input/output interface 52. The input/output interface 52 may include one or more wired connections, wireless connections, networks, or other structures that facilitate data transfer. In one example, a wireless communication interface of the PPE 14 may be part of the input/output interface 52 of the computing device 50, and at least part of the input/output interface 52 may be described as being part of the sensor assembly 20.

Sensor data generated by the sensor assembly 20 may be received by the processing circuitry 54 of the computing device 50, for example, through the input/output interface 52. The sensor data may be processed by the processing circuitry 54 or stored in the memory 56. Sensor data may be processed, for example, to generate pose data of the agent 12. Once generated, the pose data may be calibrated, or corrected, using certain data from the sensor assembly 20, which may be different than the sensor data used to generate the pose. Over time, the sensor data may be processed to generate a navigation path, or map, based on pose data representing a series of poses of the agent 12 as the agent moves through the environment 10. The sensor assembly 20 may also generate agent input data, which may indicate a desire to start building the navigation path as the agent 12 moves away from an arrival point 110 (see FIG. 3) or may indicate a desire of the agent 12 to return to the arrival point 110 (see FIG. 4). The processing circuitry 54 may generate instruction data for the agent 12 to return to the arrival point 110 in response to agent input data. The instruction data may be provided to the agent interface assembly 24, for example, through the input/output interface 52 to generate agent perceptible instructions that guide the agent 12 toward the arrival point 110.

In some embodiments, the wireless communication interface of the input/output interface 52 may include an RF device having an antenna array and may be configured to provide AoA data. The AoA data may be used by the computing device 50 to obtain information about agent position. For example, if at least one apparatus 112 (FIG. 3) having a known position (such as a GPS position or a location relative to the arrival point 110) transmits a direction-finding signal, the antenna array of the RF device may be used to capture the direction finding signal, and the computing device 50 may be used to determine phase differences in the received direction finding signal at each antenna in its array, computing an AoA of the direction finding signal.

When one apparatus 112 is in the environment, the computing device 50 may be configured to determine an approximate line emanating from the known position of the apparatus 112 based on the AoA data from the signal and may determine that the location of the PPE 14 worn by the agent 12 is along the approximate line.

When two apparatus 112 are in the environment and each transmits a distinct direction-finding signal, the computing device 50 may be configured to determine two lines based on the AoA data from the signals and may determine the location of the PPE 14 at an approximate point where the two lines intersect.

When three apparatus 112 are in the environment and each transmits a distinct direction-finding signal, the computing device 50 may be configured to determine three lines based on the AoA data from the signals and may determine the location of the PPE 14 at an approximate point in three-dimensional (3D) space where the three lines intersect. Additional apparatus 112 beyond four may be used to reduce error in the approximate point in the 3D space.

When four or more apparatus 112 are in the environment and each transmits a distinct direction-finding signal, the computing device 50 may be configured to determine at least three lines based on the AoA data from the signals and use remaining AoA data to reduce error in the determination of the approximate point in 2D or 3D space.

In some embodiments, the direction-finding signals from the apparatus 112 emit from antenna arrays with known geometry, arriving at the PPE 14 with detectable phase differences. The computing device 50 may determine the location of the PPE 14 based on the direction-finding signals, for example, based on determining an estimated AoD from the apparatus 112. AoD data may be used in a similar manner as described with respect to AoA data described herein elsewhere. For example, when one apparatus 112 are in the environment, the computing device 50 may determine the location of the PPE 14 along an approximate line emanating from the known location of the apparatus 112. When two or more apparatus 112 are in the environment, the computing device 50 may determine the location of the PPE 14 at an approximate point where two or more lines intersect.

In some embodiments, the PPE 14 may receive a wireless signal configured to provide time-of-flight (ToF) data between from one or more apparatus 112. The computing device 50 may determine an estimated distance between the PPE 14 and the apparatus 112 based on the ToF data.

With ToF data from one apparatus 112, the computing device 50 may be configured to determine that the location of the PPE 14 is along an approximate spherical surface, which has a radius equal to the estimated distance based on ToF data and an origin at the apparatus 112.

With ToF data from two apparatus 112, the computing device 50 may be configured to determine a location of the PPE 14 along an approximate line at the intersection of two approximate spherical radii, each of which have a radius equal to an estimated distance to a corresponding apparatus 112 based on ToF data and an origin at the known location of the corresponding apparatus 112. The approximate line is a circle in 3D space. In some embodiments, the location of the PPE 14 may be presumed to be limited to a two-dimensional (2D) plane (e.g., a floor of a building environment). The computing device 50 may determine that the location of the PPE 14 is one of two points based a determined intersection between the approximate line (e.g., circle) and the presumed 2D plane.

With ToF data from three apparatus 112, the computing device 50 may be configured to determine a location of the PPE 14 at an approximate point at the intersection of at least three approximate spherical radii, each of which have a radius equal to an estimated distance to a corresponding apparatus 112 based on ToF data and an origin at the known location of the corresponding apparatus 112. Alternatively, two points may be determined based on ToF data from two of the apparatus 112, and a single point may be selected based on ToF data from the third apparatus 112. Additional apparatus 112 beyond three may be used to reduce error in the determination of the approximate point in 2D or 3D space.

A combination of angular approaches (e.g., AoA and AoD) with distance approaches (e.g., ToF) may be used to improve location calibration computation, for example, with fewer apparatus 112. For example, the computing device 50 may determine a location of the PPE 14 based on an estimated distance to a single apparatus 112 based on ToF data and angle to the single apparatus 112 based on AoA or AoD data. Whether AoA or AoD data may be used depends on which of the PPE 14 and the apparatus 112 has an antenna array or a simple antenna.

The wireless communication interface may also include a global positioning system (GPS) device configured to generate calibration data, such as GPS location data, which may only be available outside or near the periphery of a hazardous building environment. When receiving sufficient signal input, the GPS device may provide GPS location data, including a 2D location estimate (or 2D position estimate), an elevation estimate, and an indication of levels of error in those estimates. The computing device 50 may be configured to determine a last known GPS location data, including last known 2D location estimate and last known elevation estimate of the PPE 14.

In some embodiments, the computing device 50 may calibrate the determined location of the PPE 14 based on the last known GPS location data and may also be calibrated based on the known position of at least one apparatus 112.

In some embodiments, the computing device 50 may derive heading data based on a time sequence of GPS location data when the agent 12 is moving. For example, change in location over time defines a velocity in a direction, which may be used as a heading, or orientation, estimate. The computing device 50 may determine the heading data based on an assumption that the agent 12 is oriented in the direction of motion of the PPE 14.

A GPS device may also provide precise timing data. The computing device 50 may use precise timing data to synchronize information from various data sources, such as various sensors or apparatus 112.

In general, motion data, heading data, and inertial data may be combined to determine agent location and heading. The computing device 50 may combine data, for example, by applying weights to each type of data or using various machine learning (ML) techniques. Combining data from various sources and sensors may facilitate more accurately determining agent location and heading. In one example, the computing device 50 may determine whether the agent 12 is facing in the same direction of movement using motion data from an IMU indicating the agent's direction of movement and heading data from a compass indicating the agent's head orientation.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein may refer to any of the foregoing structure or any other physical structure suitable for implementation of the described techniques. The techniques could be fully implemented in one or more circuits or logic elements.

Figure 3:
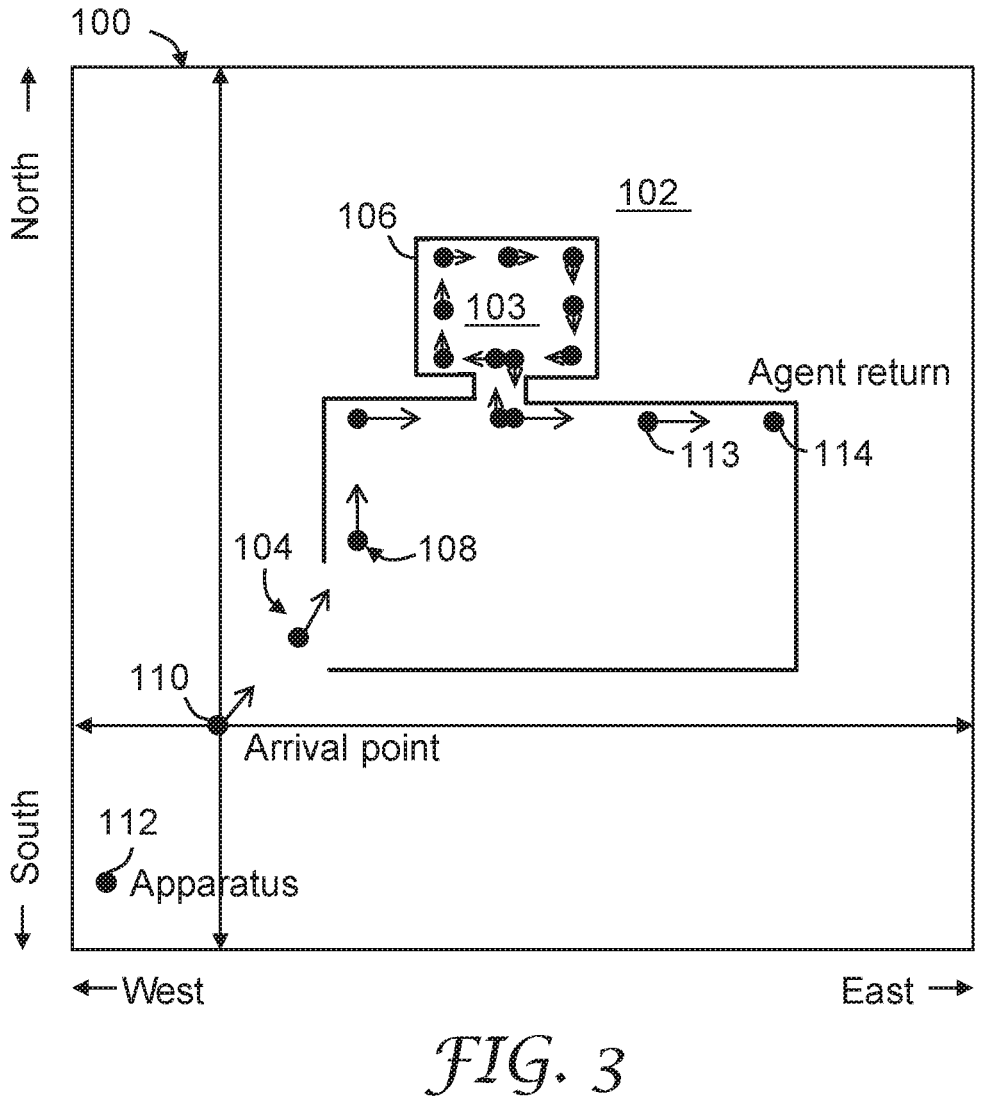
FIG. 3 illustrates a map including a navigation path generated by the PPE of FIG. 1.
Figure 4:
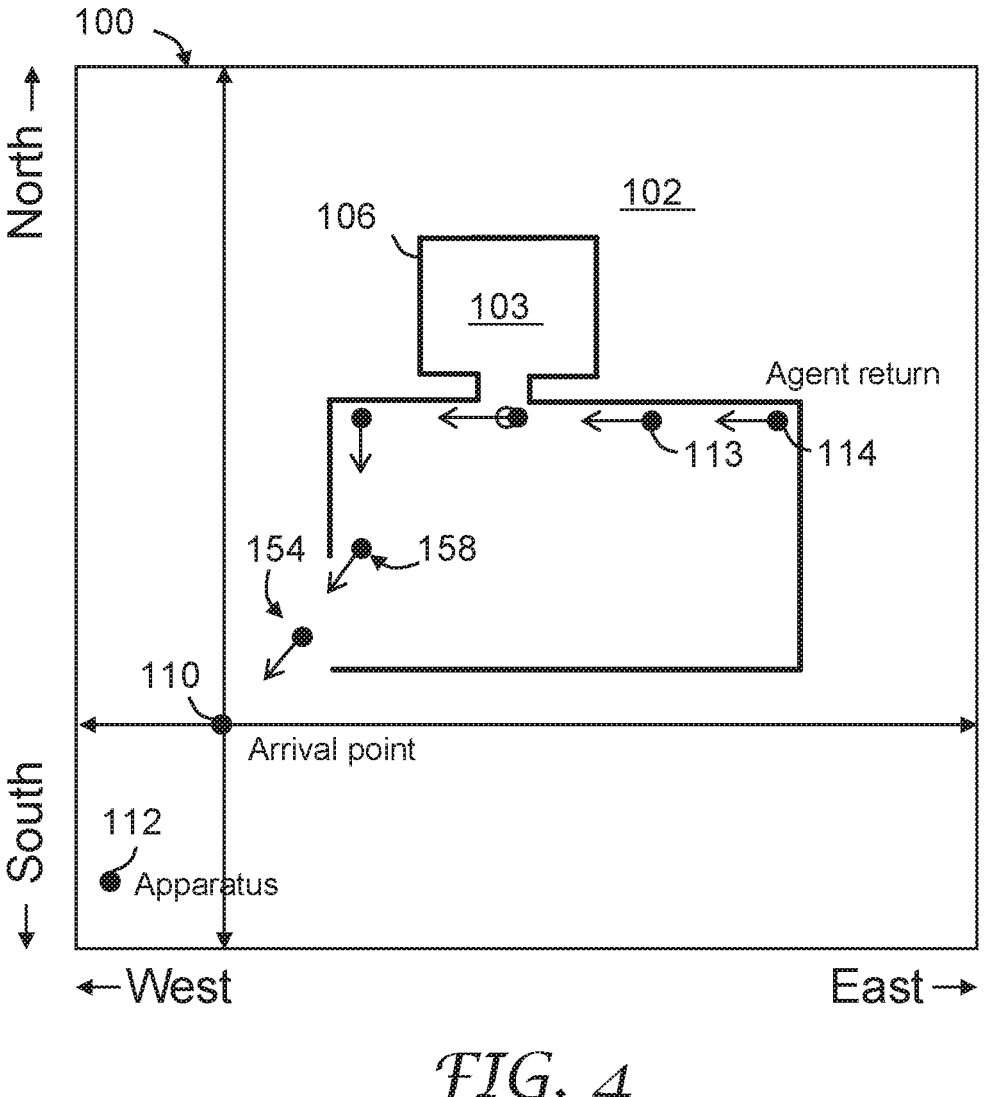
FIG. 4 illustrates a map including an egress navigation path generated by the PPE of FIG. 1.

FIGS. 3-4 show a map 100 of an environment 102. In particular, FIG. 3 shows a navigation path 104 on the map 100 generated by the PPE 14 (FIGS. 1-2). As illustrated, the map 100 is plotted in an xy-coordinate system with cardinal directions, specifically East-West on the map x-axis and North-South on the map y-axis. Although the map 100 as illustrated is two dimensional (2D), the map may also be generated as three dimensional (3D). The position, orientation, or movements may be recorded in two-dimensions or three-dimensions to support generating a 3D navigation path and agent instructions. For example, the map 100 may also include a map z-axis representing elevation, and the navigation path 104 may indicate elevation in the pose data.

The navigation path 104 may be generated in any suitable manner based on the movements of the agent 12 (FIG. 1). In some embodiments, when approaching the building 106, the agent 12 may provide agent input data using the sensor assembly 20 (FIGS. 1-2) of the PPE 14 indicating that the agent 12 is at an arrival point 110 and desires to begin building the navigation path 104. As illustrated, the arrival point 110 is at the origin of the coordinate system of the map 100. The sensor assembly 20 may begin recording sensor data related to the agent's movements.

The building 106 is shown on the map 100 for illustrative purposes. The building 106 may, or may not, be part of the map 100. In some embodiments, the map 100 generates the navigation path without data about the building 106.

The pose data may be cross-referenced, or associated with, calibration data to improve accuracy of the pose data. In one example, in response to the agent input data indicating that the agent 12 is at the arrival point 110, the processing circuitry 52 may receive calibration data through a wireless communication interface provided by an apparatus 112 (e.g., fire engine). The wireless communication interface may have Bluetooth functionality and may generate calibration data including RF device data, such as AoA, AoD, or ToF data.

As the agent moves through the environment 102, a series of poses 108 may be captured as pose data and the navigation path 104 may be generated based on the pose data. In general, the navigation path 104 is a collection, or series, of agent poses stored as pose data in memory 56 (FIG. 2) of at least one computing device 50 (FIG. 2). The navigation path 104 is generated based on sensor data captured as the agent 12 traverses through a building 106.

The first of the poses 108 may be set as the arrival point 110. The computing device 50 may be configured to determine whether the agent 12 is performing a movement activity. In response to determining that the agent 12 is performing a movement activity, the computing device 50 may determine a new pose 108, or next pose, of the agent in the navigation path 104.

The computing device 50 may be configured to determine a new pose 108 of the agent 12 based on a previous agent location, an estimated distance traveled by the agent, and the agent heading. In some embodiments, the pose 108 includes a location, a heading, and a movement activity related to the pose. The movement activity related to the pose may be used to determine the distance that the agent 12 travels between poses 108. In some embodiments, the computing device 50 is configured to determine the estimated distance traveled by the agent based on the movement activity type related to the pose 12.

The computing device 50 may determine or store a parameter defining a relationship between the estimated distance traveled by the agent 12 and the movement activity type. For example, an agent walking may be associated with a first estimated distance, an agent hands-and-knees crawling may be associated with a second estimated distance (which may be less than the first estimated distance), and an agent belly crawling may be associated with a third estimated distance (which may be less than the first estimated distance and different than the second estimated distance).

The movement activity type of the agent 12 may be determined in any suitable manner, for example, relative to the xyz-axes shown in FIG. 1 (as opposed to the xy-axes used to display the map in FIGS. 3-4). In some embodiments, the computing device 12 is configured to determine the movement activity type at least based on the inertial data. For example, the direction of gravity detected in the inertial data may provide an indication of whether the agent 12 is in an upright walking position (e.g., based on stronger signal in accelerometer x-axis than other axes) or in a crawl (either hands-and-knees or belly crawling, e.g., stronger signal in accelerometer z-axis than other axes).

In one example, hands-and-knees crawling may be differentiated from belly crawling by, for example, based on the presence and magnitude of oscillations among 3D accelerometer and 3D gyroscope data, as well as 3-axis compass heading data (e.g., from a compass sensor).

Hands-and-knees crawling may generate oscillatory angular motions predominantly around the gyroscope z-axis ("crawling yaw") as the agent 12 alternates hands, with less motion evident in the other axes. The yaw motion may be accompanied by analogous oscillating motion in compass heading data.

Belly crawling may include larger oscillatory angular motions around the gyroscope z-axis ("crawling yaw") and compass heading data compared to hands-and-knees crawling as the agent 12 alternates hands. In addition, large oscillatory angular motions may be generated around the gyroscope x-axis ("crawling roll") as the agent 12 transfers weight. Some alternating angular rate peaking around the gyroscope y-axis ("crawling pitch") may also be generated. Oscillatory rotation around the gyroscope x-axis may be accompanied by analogous oscillation in the gravity acceleration signal in the accelerometer y-axis, and alternating rotation around the gyroscope y-axis may be accompanied by analogous alternating change in the gravity acceleration signal in the accelerometer x-axis. The relative prominence of oscillation in the gyroscope x-axis ("crawling roll") and related accelerometer y-axis, and alternating peaking in the gyroscope y-axis ("crawling pitch") and related accelerometer x-axis, may be indicative of the degree of belly crawling.

As illustrated, the agent 12 walks into the building 106 from the arrival point 110 through an entryway and performs a left-hand navigation technique to navigate through the building while walking. The left-hand navigation technique refers to the agent 12 walks along a wall using a left hand as a guide. Although not shown, a right-hand navigation technique using the right hand as a guide may also be used. The agent 12 moves along a wall of the building 106 and reaches the entrance to a room 103. The agent 12 begins crawling (e.g., hands-and-knees crawling) into the room 103 in a north direction, around the room in a clockwise manner, and out of the room in a south direction. The agent 12 continues walking along toward a corner along a wall. The last pose 108 in the navigation path 104 is pose 114.

The illustrated navigation path 104 shows that the space between the poses 108 while walking is greater than while crawling due to the estimated distance traveled being different. The illustrated vectors associated with each pose 108 reflect the estimated distance traveled. Although not shown, a vector for a pose 108 associated with the estimated distance traveled while belly crawling would be illustrated even smaller.

The pose 108 of the agent 12 may be determined in any suitable manner using sensor data from the sensor assembly 20. In some embodiments, the sensor data includes sensor data from at least a motion detector including an accelerometer and a heading detector including a compass sensor. For example, sensor data from an accelerometer may be used to determine whether the agent is taking steps.

In some embodiments, machine learning (ML) techniques may be employed to train a pose determination model, which may be used to more accurately determine the agent location, orientation, or movement activity type, which may include determining a movement activity type or an estimated distance traveled.

In some embodiments, ML techniques may incorporate a combination of classifiers and optionally regressors. Classifiers may be selected to determine high-level states, such as the movement activity of the agent 12 (e.g., walk, sidestep, hands-and-knees crawling, belly crawling, etc.). Regressors may be selected to generate estimates of distance traveled by the agent 12, for example, a regressor for estimated distance traveled for each movement activity. Alternatively, estimated distance traveled may also be determined based on deterministic techniques, such as directly counting oscillations and having a scale factor per oscillation based on the particular movement activity.

FIG. 4 shows an egress navigation path 154 on the map 100 generated by the PPE 14 (FIGS. 1-2) instead of the navigation path 104 as shown in FIG. 3. The egress navigation path 154 may be used in response to agent input data indicating a desire to return to the arrival point 110. Agent input data may be processed and generated by the computing device 50 (FIGS. 1-2) based on, and in response to, agent input captured by the sensor assembly 20 (FIGS. 1-2).

In response to the agent input data indicating a desire to return to the arrival point 154, the computing device 50 may generate pose data of the agent 12 based on the sensor data in response to a series of movements by the agent toward the arrival point. The computing device 50 may generate instruction data based on the navigation path 104 (FIG. 3) and the pose data. The computing device 50 may provide instruction data to the agent interface assembly 24 (FIG. 2) to generate agent perceptible output to guide the agent 12 toward the arrival point 110. Agent perceptible output may include aural information (e.g., audio prompts), visual information (e.g., visual indicators), or tactile information (e.g., haptic feedback), or a combination of all three.

The egress navigation path 154 may be generated based on the navigation path 104 generated as the agent 12 moves through the environment 102. In some embodiments, the computing device 50 may generate the egress navigation path 154 based on reversing the navigation path 104. The computing device 50 may also determine whether to remove one or more poses from the egress navigation path, for example, based on a radius threshold. When the agent 12 is at a current pose, the computing device 50 may determine that a distance to a subsequent pose in the egress navigation path 154 is less than the radius threshold and the subsequent pose is not the next pose in the egress navigation path, the egress navigation path 154 may be modified to remove, or "skip", the next pose (and other subsequent poses) between the current pose and the subsequent pose. The instruction data provided may be determined based on the egress navigation path 154.

As illustrated, the agent 12 may provide agent input indicating a desire to return to the arrival point 110 when at pose 114. For example, the agent 12 may tap a facepiece of the PPE 14 three times, which is detectable by an inertial detector or other suitable sensor.

The egress navigation path 154 may be generated, or retrieved from memory. In general, the egress navigation path 154 includes a set of poses 158 similar to the poses 108 of the navigation path 104 of FIG. 3. In particular, the poses 158 in the egress navigation path 154 generally include the same locations, reversed headings, and the same movement activities such that each pose 158 directs the agent 12 to the previous pose 108 in the navigation path 104. For example, pose 113 in navigation path 104 has a heading that points to the location of pose 114 and a particular movement activity (e.g., walking). In turn, pose 114 in egress navigation path 104 has a heading that points to the location of pose 113 (e.g., a reversed heading) and the same movement activity (e.g., walking) such that the navigation path 154 can be used as a guide for the agent 12 to return to the arrival point 110.

In some embodiments, such as the illustrated embodiment, the egress navigation path 154 has one or more poses 108 removed. In particular, the poses 108 associated with the agent 12 crawling through the room 103 are removed (shown as empty circles in FIG. 4 but shown as filled circles in FIG. 3). The egress navigation path 154 passes by the threshold, or entrance, the room 103 instead of leading the agent 12 through the room 103. In this manner, the egress navigation path 154 may be described as "optimized" to reduce the distance or time required for the agent 12 to return to the arrival point 110.

The egress navigation path 154 may be modified compared to the navigation path 104 in other ways beyond removing poses. In one example, the headings or associated estimated distance traveled associated with each pose 158 may be modified due to the removal of some poses 108 from the navigation path 104. For example, if the removal of a pose 108 requires the agent to perform an extra movement activity to pass the threshold of the room 103, the egress navigation path 154 may have an added pose (not shown) that is not included in navigation path 104.

Even though the egress navigation path 154 may be modified, the navigation path 154 may adhere to complementary, or otherwise similar, navigation principles that were used to generate the navigation path 104. For example, if the navigation path 104 is generated using a left-hand navigation technique, then navigation path 154 may generate poses 158 only based on a right-hand navigation technique. In this manner, the "optimized" path may not be the absolute fastest path to the arrival point 110, but may be one of the fastest, or fastest path to the arrival point 110 adhering to the complementary navigation principle.

As the agent 12 progresses along the egress navigation path 154, the pose data generated may be cross-referenced, or associated with, calibration data to improve accuracy of the pose data. In some embodiments, a wireless communication interface of the sensor assembly 20 may generate calibration data based on wireless contact with the apparatus 112, which has a known location relative to the map 100 and related mapping information, such as the building 106 or the arrival point 110. When the agent 12 approaches the arrival point 110, the sensor assembly 20 may come into wireless contact with the apparatus 112 and generate calibration data. The calibration data may be used to generate an estimated proximity to the arrival point 110. The pose 158 of the agent 12 may be updated based on the estimated proximity. In this manner, the pose 158 of the agent 12 may be calibrated.

FIG. 5 is a flow diagram of a process 200 for generating a map that may be used to guide the agent back to an arrival point. The process 200 may include determining whether to start building navigation path in block 202. In some embodiments, the determination may be made based on sensor data, such as agent input data, indicating a desire of the agent to begin building the map. The pose associated with beginning to build the map may be described as the arrival point.

The process 200 may receive movement-related sensor data in block 204. Sensor data, such as location data, heading data, and inertial data, may be collected. Such movement-related sensor data may be used to estimate a location of the agent, such as a relative location of the agent, to the arrival point.

Pose data may be generated in block 206 based on the sensor data. The generated pose data may represent a series of movements of the agent away from the arrival point. Each pose may include, or be associated with, an agent location (at least relative to the arrival point), an agent heading, and a movement activity type for each pose in a series of poses.

A navigation path may be generated based on the pose data in block 208. The navigation path may represent the movements of the agent over time.

Figure 6:
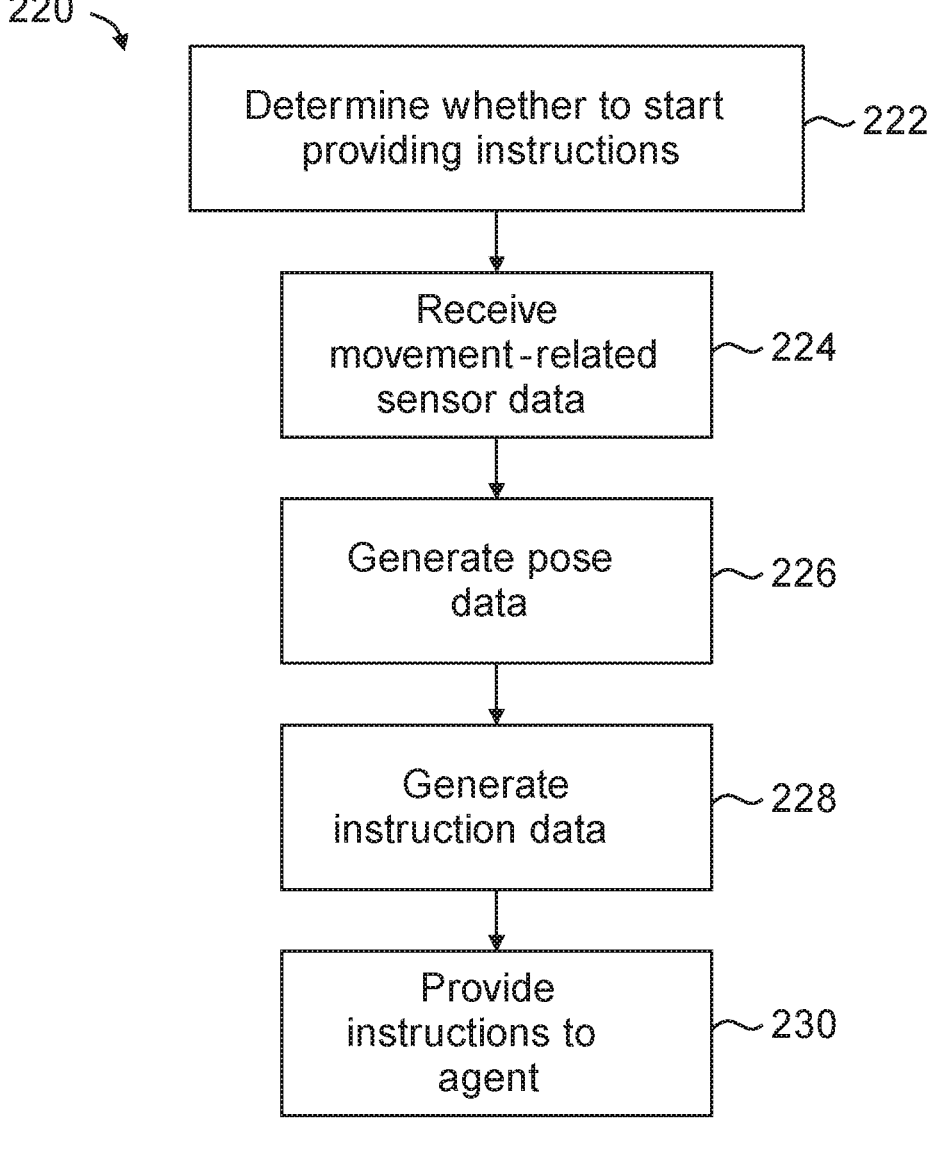
FIG. 6 illustrates a flow diagram of a process for providing navigation using the PPE of FIG. 1.

FIG. 6 is a flow diagram of a process 220 for providing navigation using a map. The map may be generated by the process 200 (FIG. 5). The process 220 may include determining whether to start providing instructions in block 222. In some embodiments, the determination may be made based on sensor data, such as agent input data, indicating a desire of the agent to return to the arrival point from the agent's current location.

The process may receive movement-related sensor data in block 224. Sensor data, such as location data, heading data, and inertial data, may be collected. Such movement-related sensor data may be used to estimate a location of the agent, such as a relative location of the agent, to the arrival point.

Pose data may be generated in block 226 based on the sensor data. The generated pose data may represent a series of movements of the agent toward the arrival point. Each pose may include, or be associated with, an agent location (at least relative to the arrival point), an agent heading, and a movement activity type for each pose in a series of poses.

Instruction data may be generated in block 228. The instruction data may be generated based on the navigation path, which may be generated in block 208 (FIG. 5). In some embodiments, an egress navigation path may be generated, which may be based on reversing the navigation path and may include further modifications, such as removing or adding poses.

Instructions may be provided to the agent in block 230. The instruction data may be provided to an agent interface assembly, which is configured to generate agent perceptible output to guide the agent toward the arrival point.

Figure 7:
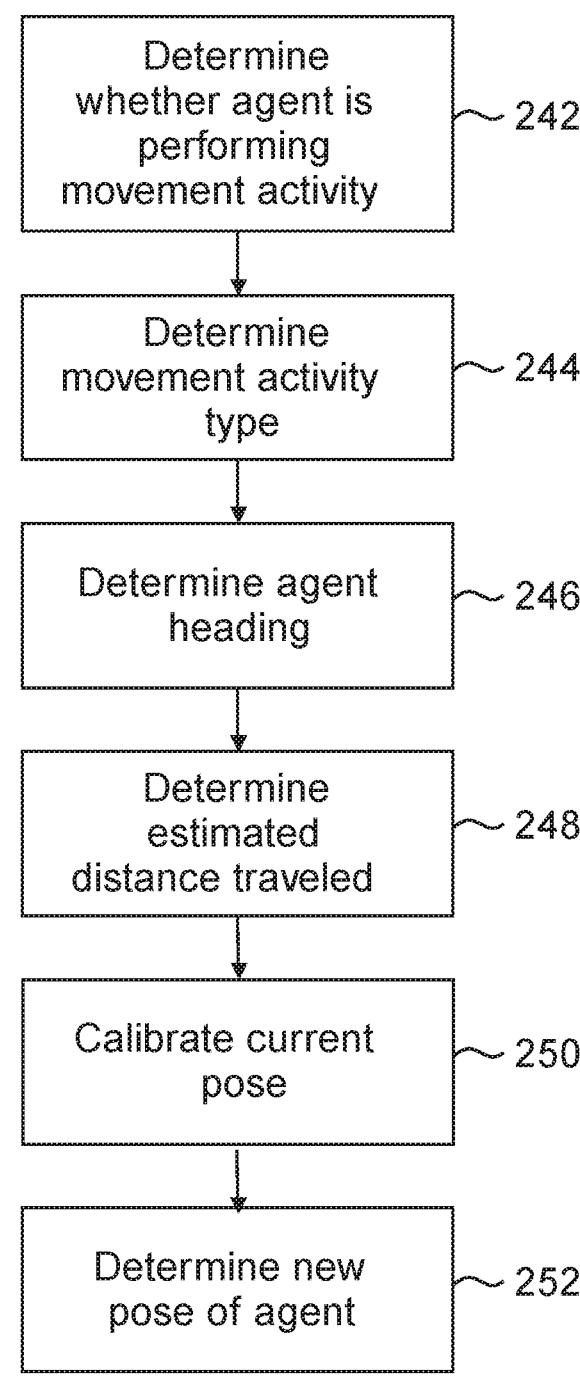
FIG. 7 illustrates a flow diagram of a process for calibrating a pose in a map using the PPE of FIG. 1.

FIG. 7 is a flow diagram of a process 240 for calibrating a pose in a map. The pose may be generated by the process 200 (FIG. 5) or the process 220 (FIG. 6). The process 240 may include determining whether the agent is performing a movement activity in block 242. In some embodiments, the determination may be made based on sensor data, such as movement-related sensor data, representative of the movement of the agent 12. In one example, the agent may be performing a movement activity when an accelerometer detects that the agent has made a minimum number of movements in a certain direction, such as 3, 5, or even 7 steps.

The process 240 may include determining a movement activity type in block 244. The movement activity type may be a mode that the agent is using to move through an environment, such as walking, hands-and-knees crawling, or belly crawling. Each may be associated with a different estimated distance traveled. The type of movement activity may be determined based on, for example, the position of the agent's torso based on inertial data, which may indicate an upright orientation associated with walking or a bent-over orientation associated with crawling.

An agent heading may be determined in block 246. The agent heading may be determined using heading data, such as data from a compass sensor.

An estimated distance traveled by the agent may be determined in block 248. An estimated distance traveled may be a predetermined number associated with a particular movement activity and stored in memory. For example, an estimated distance traveled for each step (e.g., cycle or increment) while walking may be approximately 0.9 to 1.0 meters, or determined based on empirical data. An estimated distance traveled for each cycle while hands-and-knees crawling may be approximately 0.7 to 0.8 meters, or determined based on empirical data. An estimated distance traveled for each cycle while belly crawling may be approximately 0.8 to 0.9 meters, or determined based on empirical data. For each step or cycle detected, an estimated distance traveled may be determined based on the collection of movements. The estimated distance traveled may be represented in a navigation path of a map by the distance between consecutive poses.

The current pose may be optionally calibrated in block 250. The current pose of the agent may be cross-referenced, or calibrated, with other sensor data, such as calibration data. Non-limiting examples of calibration data include AoA data from a Bluetooth device or location data from a GPS device. Such calibration data may be limited in availability in the environment. For example, such calibration data may only be available in a limited proximity near an arrival point.

A new pose of the agent may be determined in block 252. The new pose may be determined based on a previous agent location (or pose), an estimated distance traveled by the agent (based on movement activity type), and the agent heading.

Figure 8:
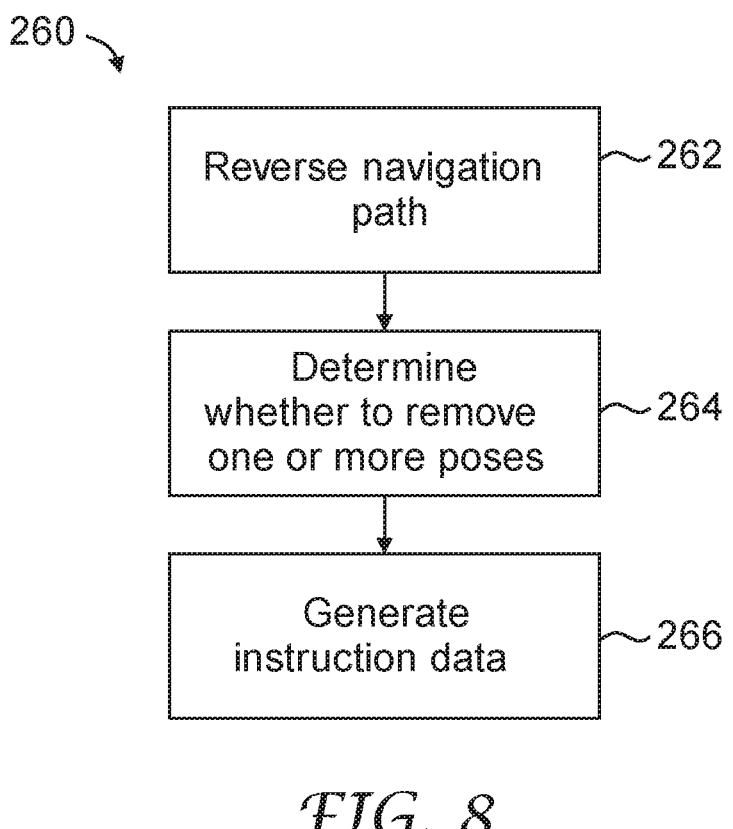
FIG. 8 illustrates a flow diagram of a process for generating an egress navigation path using the PPE of FIG. 1.

FIG. 8 is a flow diagram for a process 260 for generating instruction data based on an egress navigation path, which may be used in block 228 (FIG. 6). The process 260 may include reversing a navigation path 262. The navigation path 262 may be generated in block 208 (FIG. 5). Reversing navigation path may include associating each agent location in the navigation path with a vector to travel to a previous pose along the navigation path. A reversed navigation path may be described as an egress navigation path.

The process 260 may include determining whether to remove one or more poses in block 264. Certain poses in the egress navigation path may be determined to be non-necessary to guide the agent back to the arrival point, which may be based on a radius threshold described herein elsewhere in more detail. In one example, an agent may navigate through a room along a hallway while moving away from the arrival point and generate poses within the room, whereas the agent may be able to return to the arrival point without navigating back through the room, so those poses may be removed from the egress navigation path.

The instruction data may be generated in block 266 based on the egress navigation path. In particular, the egress navigation path may be a reversed navigation path generated when the agent moved away from the arrival point, and certain poses may be removed to "optimize" the path of the agent back toward the arrival point.

Thus, various embodiments of PERSONAL PROTECTIVE EQUIPMENT WITH MOVEMENT-BASED NAVIGATION are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

The terms "coupled" or "connected" refer to elements being attached to each other either directly (in direct contact with each other) or indirectly (having one or more elements between and attaching the two elements). Either term may be replaced to "couplable" or "connectable" to describe that the elements are configured to be coupled or connected. In addition, either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The term "or" is generally employed in its inclusive sense, for example, to mean "and/or" unless the context clearly dictates otherwise. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A system comprising:
personal protective equipment (PPE) configured to be worn by an agent, wherein the PPE includes a sensor assembly comprising a head-mounted inertial detector and a body-mounted inertial detector, each configured to generate three-dimensional accelerometer data and three-dimensional gyroscope data, and a compass sensor configured to generate heading data; and
at least one computing device comprising a memory and processing circuitry coupled to the memory, wherein the at least one device is configured to:
receive the sensor data from the sensor assembly;
generate pose data of the agent based on the sensor data in response to a series of movements by the agent away from an arrival point, wherein for each pose the pose data includes an agent location, an agent heading, and a movement activity type selected from walking, hands-and-knees crawling, and belly crawling;
generate a navigation path based on the pose data; and
wherein the processing circuitry determines the movement activity at least by (i) using gravity-vector orientation derived from the accelerometer data to distinguish upright walking from crawling, and (ii) detecting oscillatory angular motions in the gyroscope data including yaw, roll, and pitch and comparing signals from the head-mounted inertial detector and the body-mounted inertial detector to differentiate hands-and-knees crawling from belly crawling, and computes the agent location for each pose from a previous pose location, the agent heading, and an activity-dependent estimated distance per step or crawl cycle determined according to the movement activity type.

2. The system of claim 1, wherein the sensor assembly comprises a wireless communication interface configured to determine angle of arrival data from a direction-finding signal.

3. The system of claim 1, wherein the sensor assembly is configured to capture agent input and generate agent input data, wherein the PPE further comprises an agent interface assembly configured to provide agent perceptible output, wherein the agent perceptible output comprises a visual, aural, or tactile information, and
wherein the at least one computing device is further configured to:
process agent input from the sensor assembly to generate agent input data; and
in response to the agent input data indicating a desire to return to the arrival point,
generate pose data of the agent based on the sensor data in response to a series of movements by the agent toward the arrival point,
generate instruction data based on the navigation path and the pose data, and provide instruction data to the agent interface assembly to generate agent perceptible output to guide the agent toward the arrival point.

4. The system of claim 3, wherein the agent interface assembly comprises at least one of a heads-up display, a transducer, or a tactile actuator.

5. The system of claim 3, wherein to generate instruction data, the at least one computing device is further configured to:

generate an egress navigation path based on reversing the navigation path;

determine whether to remove one or more poses from the egress navigation path; and determine the instruction data based on the egress navigation path.

6. The system of claim 5, wherein to determine whether to remove one or more poses, the at least one computing device is configured to determine a radius threshold.

7. The system of claim 6, wherein to determine whether to remove one or more poses, the at least one computing device is configured to remove one or more poses based on a distance to a subsequent pose in the egress navigation path being less than the radius threshold and the subsequent pose is not a next pose in the egress navigation path.

8. The system of claim 1, wherein the at least one computing device further comprises a wireless communication interface configured to generate calibration data based on wireless contact with one or more apparatus having a known location relative to the mapping information, and wherein the at least one computing device is further configured to:

generate an estimated proximity to the arrival point based on the calibration data; and update pose data in response to the estimated proximity.

9. The system of claim 1, wherein the head-mounted inertial detector is used to capture rotation of the head and the body-mounted inertial detector is used to capture translational motion decoupled from head rotations.

10. The system of claim 1, wherein the body-mounted inertial detector comprises a 6-axis inertial measurement unit that provides three-dimensional accelerometer data and three-dimensional gyroscope data and is mounted proximate to an upper back of the agent, and the compass sensor comprises a three-axis magnetic sensor.

11. The system of claim 1, wherein, in response to agent input indicating a desire to the arrival point, the at least one computing device is configured to generate an egress navigation path based on reversing the navigation path, determine whether to remove one or more poses from the egress navigation path based on a radius threshold, and remove one or more poses when a distance to a subsequent pose in the egress navigation path is less than the radius threshold and the subsequent pose is not a next pose.

12. The system of claim 1, wherein the egress navigation path adheres to a complementary navigation principle relative to the navigation path such that when the navigation path is generated using a left-hand navigation technique, the egress navigation path is generated using a right-hand navigation technique.

* * * * *